L. VEYRET.
BACK PEDALING CHANGE SPEED GEAR APPLICABLE TO BICYCLES.
APPLICATION FILED OCT. 22, 1917.
1,275,505.
Patented Aug. 13, 1918.
2 SHEETS—SHEET 1.
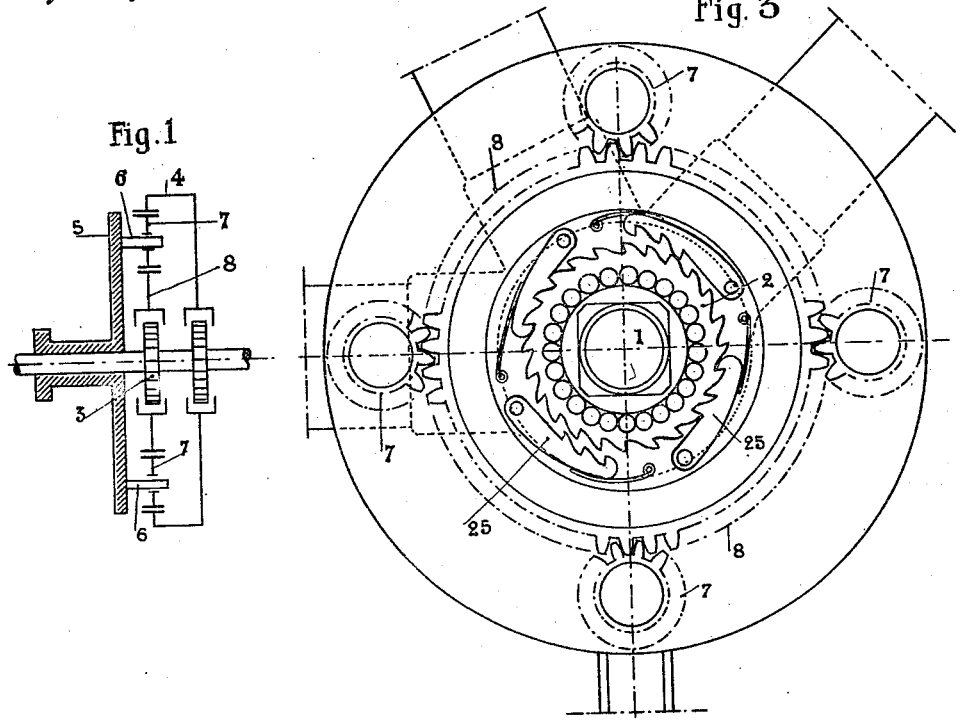
Fig. 3
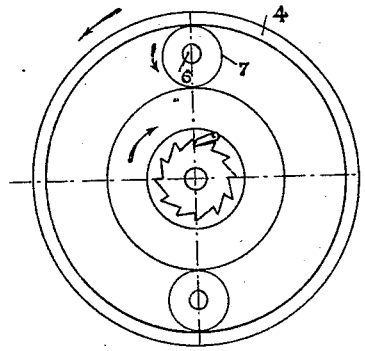
Fig. 1
Fig. 2
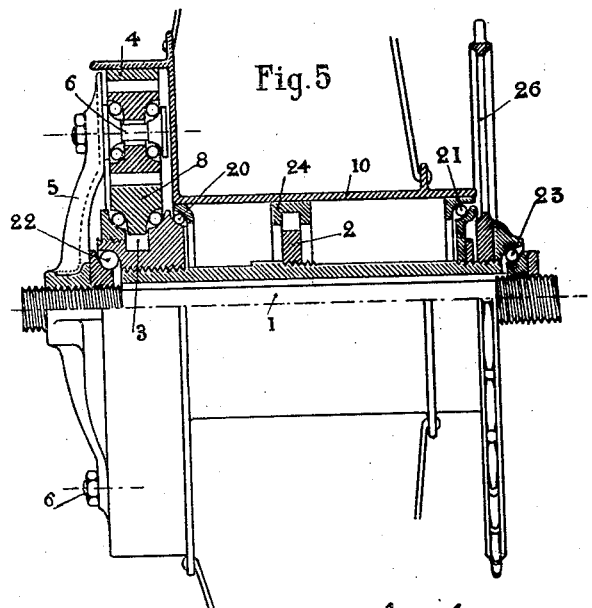
Fig. 5

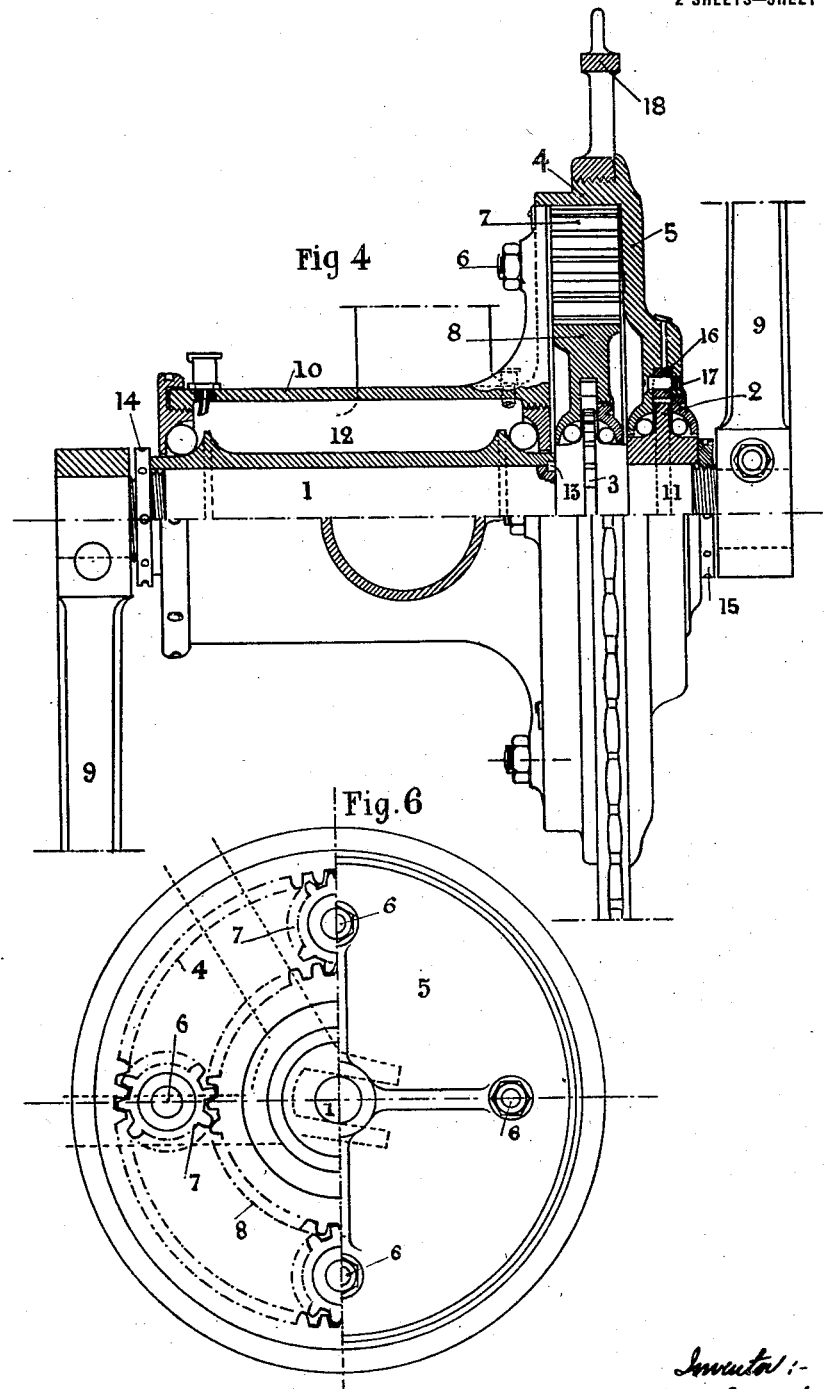

UNITED STATES PATENT OFFICE.

LOUIS VEYRET, OF PARIS, FRANCE.

BACK-PEDALING CHANGE-SPEED GEAR APPLICABLE TO BICYCLES.

1,275,505.  Specification of Letters Patent.  Patented Aug. 13, 1918.

Application filed October 22, 1917. Serial No. 197,892.

*To all whom it may concern:*

Be it known that I, LOUIS VEYRET, residing at Paris, France, have invented new and useful Back-Pedaling Change-Speed Gear Applicable to Bicycles, of which the following is a specification.

This invention relates to a mechanism which enables a shaft which can rotate in both directions, to transmit a movement always having the same direction, to another shaft or pinion, the movement in one direction transmitting however a greater speed to the driven shaft than the movement in the opposite direction.

In the accompanying drawing given merely by way of example,

Figure 1 is a diagrammatic view of the gear in axial section;

Fig. 2 is a front elevation corresponding to Fig. 1;

Fig. 3 is a front elevation showing application of the gear to the crank mechanism of a bicycle;

Fig. 4 is a view, half in axial section and half in elevation, corresponding to Fig. 3;

Fig. 5 is a view, half in axial section and half in elevation, showing application of the gear to the hub of a driving wheel of a bicycle, and Fig. 6 is a front elevation corresponding to Fig. 5, a disk being supposed to have been removed on the left hand half of the figure so as to show the mechanism.

In the diagrammatic Figs. 1 and 2, the driving shaft 1 has two ratchet gears 2 and 3 which act in opposite directions. The pinion 4 is that which is to be driven, and it is in engagement with the ratchet gear 2; a disk 5 carries the spindles 6 of the auxiliary satellite pinions 7 engaging with a central pinion 8 which is in engagement with the ratchet gear 3.

When the shaft 1 is moved in the direction of the arrow *f* which in a bicycle indicates the usual direction of forward traveling, the ratchet gear 2 drives direct the pinion 4 which, by means of a chain or other gear, propels the driving wheel in the forward direction. The pinion 4 transmits to the satellite pinions 7 a movement of rotation which they transmit to the central pinion 8 which rotates loosely on the ratchet gear 3 in the direction opposite to that of the shaft 1, without producing any effect.

If the spindle 1 is rotated in the opposite direction by back-pedaling, in the event of an application to a bicycle, the ratchet gear 2 will be unable to drive the pinion 4, but the ratchet gear 3 will drive the pinion 8 which, by means of the satellites 7, will transmit to the pinion 4 the movement of rotation in the same direction as previously, that is to say in the direction of forward traveling, but at a speed reduced in the same ratio as that of the radii of the pinions 8 and 4.

In case of the application of the gear to the crank mechanism of a bicycle, the shaft 1 will be the shaft carrying the pedals 9 and rotating in the interior of the cylindrical casing 10 of the crank mechanism, as usual. The ratchet gear 2 is mounted on a square portion 11 of the shaft 1, and the back-pedaling ratchet gear 3 is keyed to the same shaft 1. The cones of the ball bearings of the said shaft 1 form part of a cylindrical tube 12 keyed to the same by means of a projection 13 (Fig. 4); as regards the cups, they are screwed in the usual manner at the ends of the crank mechanism, as clearly shown in the drawing. Adjustment is effected by means of a nut 14 screwed on the shaft 1 at the left hand side of the crank mechanism and capable of being locked on the same by means of a screw, not shown. This method of mounting makes it possible to remove the crank shaft and the whole mechanism on removing the left hand pedal and the nut 14, without disturbing the ball bearings of the crank shaft, since the cylinder 12 remains in place.

The ratchet gear 3 can be uncovered by removing the right hand pedal, a nut 15 screwed on the shaft 1 between the said pedal and the ratchet gear 2, and by removing also the ratchet wheel 2 which drives the disk 5, the central part of which comprises two halves suitably connected so as to inclose the ratchet wheel 2 and to contain the pawls 16, the spindles of which are formed by the screws 17 which connect together the two halves of the disk 5.

The elements of the gear are marked with the same reference numbers as in Figs. 1 and 2, and it is unnecessary to describe them.

The principal pinion 4 which is provided with inner teeth and secured to the disk 5, carries the toothed wheel 18 on which is wound the chain passing on the other hand over the hub of the driving wheel in order to transmit to it a movement of rotation.

In the construction shown in Figs. 5 and 6 relating to the application of the gear to the hub of a driving wheel of a bicycle, the driving shaft 1, like in the previous case, is arranged in the axis of the casing 10 of the hub, but it is stationary, and about it can rotate a cylindrical socket 19 which carries the ratchet wheels 2 and 3 acting in opposite directions, as already explained. The hub 10 can rotate about the socket 19 by means of ball bearings 20 and 21, and the socket 19 itself rotates about the shaft 1 by means of ball bearings 22 and 23. The disk 5 is preferably provided with ribs in order to strengthen it, and screwed on the shaft 1; it carries by means of pins 6 and ball bearings, the satellite pinions 7 which engage with the central pinion 8 engaging with the ratchet wheel 3 and a ring 4 with inner teeth secured to the hub 10. In the interior of the said hub, facing the ratchet wheel 2, is secured a ring 24, to the interior of which are secured the pawls which act on the said ratchet wheel. The chain pinion 26 is secured to one end of the socket 19.

The same reference numbers indicate intentionally in this construction the parts corresponding to those of Figs. 1 and 2, and the working is identical with that described; that is to say that, when the pinion 26 is rotated in the direction of normal pedaling, the ratchet wheel 2 drives direct the hub 10; in the event of back pedaling, it will be the ratchet wheel 3 which, by means of the central pinion 8 and satellite pinions 7, will drive the toothed ring 4 and therefore the hub 10 in the same direction as before, but at a reduced speed.

The fitting and dismantling of the elements arranged as just described are extremely easy, as well as the adjustment of the bearings.

In the constructions shown in Figs. 3–6 of the drawing, it has been assumed that there were four satellite pinions 7, but it is obvious that the number in question could be increased or reduced according to the dimensions of the gear and to the applications; in the same way, in Fig. 3, the pawls 25 controlled by return springs, have the shape of hooks with several teeth for the purpose of enabling each of the pawls to engage at once with several teeth of the corresponding ratchet wheel, but it is obvious that any other known pawl system could be used.

Having now particularly described and ascertained the nature of my said invention, and in what manner the same is to be performed, I declare that what I claim is:

In a change speed gear for a bicycle of the character described, the combination of a driving shaft with two ratchet gears acting in opposite directions, a pinion adapted to be driven by one of said ratchets in the direction of pedaling, other pinions to which the rotation of said pinion is transmitted and a central pinion rotating loosely on the second of said ratchet gears in a direction opposite to that of said shaft, and adapted to transmit rotation to the first named pinion in the direction of motion with a speed reduced at the same ratio as the difference between the radii of the first and second named pinions, substantially as described.

In testimony whereof I affix my signature in presence of two witnesses.

LOUIS VEYRET.

Witnesses:
ABEL JULIEN,
JULES LEBREUX.

Copies of this patent may be obtained for five cents each, by addressing the "Commissioner of Patents, Washington, D. C."